United States Patent
Knott

Patent Number: 5,565,183
Date of Patent: Oct. 15, 1996

[54] METHOD FOR THE PREPARATION OF ALUMINUM HYDRIDE (ALH₃) BY REACTING MAGNESIUM HYDRIDE WITH ALUMINUM HALIDE

[75] Inventor: Wilfried Knott, Essen, Germany

[73] Assignee: Th. Goldschmidt AG, Essen, Germany

[21] Appl. No.: 329,936

[22] Filed: Oct. 27, 1994

[30] Foreign Application Priority Data

Oct. 27, 1993 [DE] Germany .......................... 43 36 602.3

[51] Int. Cl.⁶ .................................. C01B 6/00; C01B 6/04
[52] U.S. Cl. ................................................ 423/645; 423/647
[58] Field of Search ...................................... 423/645, 647

[56] References Cited

U.S. PATENT DOCUMENTS

| | | | |
|---|---|---|---|
| 3,812,244 | 5/1974 | Schmidt et al. | 423/645 |
| 3,829,390 | 9/1974 | Ashby et al. | |
| 3,857,922 | 12/1974 | Matzek et al. | 423/645 |
| 4,832,934 | 5/1989 | Bogdanovic et al. | |
| 5,198,207 | 3/1993 | Knott et al. | 423/647 |

FOREIGN PATENT DOCUMENTS

| | | |
|---|---|---|
| 0003564 | 8/1979 | European Pat. Off. . |
| 845338 | 7/1952 | Germany . |
| 4039278 | 6/1992 | Germany . |
| 4235334 | 4/1994 | Germany . |
| 785348 | 7/1955 | United Kingdom . |

OTHER PUBLICATIONS

E. C. Ashby, The Chemistry of Complex Aluminohydrides, 1970, 3 pages.
Von Egon Wiberg, et al. Neues Zur Kenntnis Des . . . , 1952, 2 pages.
Von Egon Wiberg, et al, Zur Kennthis Eines . . . , 1950, 2 pages.
A. E. Finholt, et al, Lithium Aluminum Hydride . . . , 1947, 5 pages.
Ullmann's Encyclopedia, Hydrides, pp. 213–214.

*Primary Examiner*—Wayne Langel
*Attorney, Agent, or Firm*—Anderson, Kill & Olick, P.C.

[57] ABSTRACT

A method for the preparation of aluminum hydride (AlH₃) by the reaction of magnesium hydride with aluminum halide in presence of solvents is utilized with the distinguishing feature that the magnesium hydride is obtained by the reaction of magnesium with hydrogen at a temperature of at least 250° C. and a pressure of 0.5 to 5 MPa with the proviso that, before the hydrogenation, magnesium hydride with a particle size not greater than 400 μm is added before the hydrogenation in amounts of at least 1.2% by weight, based on the magnesium to be hydrogenated, to the magnesium that is to be hydrogenated, and the reaction between magnesium hydride and aluminum halide is carried out at a temperature ranging from 20° to 110° C. for a period of 30 minutes to 5 hours while constantly grinding the reactants, $MgH_2$ and $AlX_3$ (X being halogen), in the molar ratio of at least 3:2 in 1,4 dioxane.

2 Claims, No Drawings

METHOD FOR THE PREPARATION OF ALUMINUM HYDRIDE (ALH$_3$) BY REACTING MAGNESIUM HYDRIDE WITH ALUMINUM HALIDE

OBJECT OF THE INVENTION

The invention relates to a method for the preparation of aluminum hydride (AlH$_3$) by the reaction of magnesium hydride with aluminum halide in the presence of solvents.

BACKGROUND INFORMATION AND PRIOR ART

Finholt, Bond and Schlesinger (J. Am. Chem. Soc. 69, 1199, (1947)) describe the preparation of aluminum hydride (AlH$_3$) in diethyl ether from AlCl$_3$ and LiH in accordance with the equation:

$$AlCl_3 + 3\ LiH \rightarrow AlH_3 + 3\ LiCl$$

This reaction, however, easily continues to LiAlH$_4$ by the following exothermic reaction:

$$AlH_3 + LiH \rightarrow LiAlH_4$$

Advisably, according to Ullmann's Encyclopedia of Industrial Chemistry, volume A 13, pages 213–214, aluminum hydride is prepared from lithium alanate by reaction with aluminum chloride or mineral acids in diethyl ether $$3\ LiAlH_4 + AlCl_3 \rightarrow 4\ AlH_3 + 3\ LiCl$$

$$LiAlH_4 + HX \rightarrow AlH_3 + LiX + H_2$$

(HX= HCl or H$_2$SO$_4$).

The use of expensive lithium aluminum hydride, which is somewhat dangerous to handle, is a disadvantage of this synthesis.

Early on, therefore, attempts were made to replace the complex hydride LiAlH$_4$ with other lithium-free hydrides, in order to make the AlH$_3$ accessible in this way.

For example, the U.S. Pat. No. 3,829,390 discloses the preparation of stable chloride-free and lithium salt-free AlH$_3$ solutions in lower dialkyl ethers using sodium aluminum hydride according to the following equation:

$$3\ NaAlH_4 + AlCl_3 \rightarrow 4\ AlH_3 + 3\ NaCl$$

However, by avoiding the use of lithium, this method is not freed from having to use alkali aluminum hydride, the synthesis of which is expensive.

There has been no lack of attempts to use magnesium hydride for the preparation of aluminum hydride or compounds derived therefrom.

Wiberg and Bauer came to the conclusion that the reaction with MgH$_2$ in diethyl ether, which is similar to the Schlesinger reaction, results in the formation of magnesium aluminum hydride having the formula Mg(AlH$_4$)$_2$ (Zeitschrift fuer Naturforschung 5b, 397, (1950) and 4b, 131, (1952) as well as the German patent 845,338). Ashby, however, subsequently proved in Inorganic Chemistry, 9, pages 325–326, (1970) that the MgH$_2$, produced in this reaction hydrogenolytically from Grignard compounds or diorganomagnesium compounds, reacts with aluminum halide to form halogen magnesium alanate (XMgAlH$_4$).

The Belgian patent 785,348 discloses a method for the preparation of AlH$_3$ or Mg(AlH$_4$)$_2$ by reacting MgH$_2$ with AlCl$_3$ in the presence of aluminum in diethyl ether:

$$2\ AlCl_3 + 3\ MgH_2 + Al \rightarrow 2\ AlH_3 + 3\ MgCl_2 + Al$$

$$2\ AlCl_3 + 4\ MgH_2 + Al \rightarrow 2\ Mg(AlH_4)_2 + 3\ MgCl_2 + Al$$

Experimental proof to confirm the course of the reaction and of the nature of the products was not given, as was already pointed out by Ashby (loc. at.).

The method of the U.S. Pat. No. 4,832,934 once more takes up the reaction of MgH$_2$ with aluminum halide in cyclic or aliphatic ethers, the highly active MgH$_2$, used here, being prepared by a method of the European patent 0 003 564. The reaction of this magnesium hydride, which is accessible particularly by using complex catalyst systems, with aluminum halide leads to compounds of the general formula $$[\ Mg_2X_3(Ether)_y]^+ [\ AlH_4]^-$$

in which X is a halogen, ether is a cyclic or aliphatic ether and y is a number from 0 to 6. It is stated explicitly in the US patent that, despite grinding, that is, despite mechanical activation, this product cannot be prepared using conventional, commercial MgH$_2$. This is also shown in a comparison example. The use of the complex catalyst system, described in the European patent 0 003 564, thus is essential for the preparation of active magnesium hydride by this method. By using dioxane, it is possible to separate 1 mole of MgCl$_2$ from the aforementioned product. A product having the formula XMgAlH$_4$ is obtained. AlH$_3$ cannot be prepared in this way.

The German Offenlegungschrift . . . (patent application P 42 35 334.5) is concerned with the problem of using inexpensive magnesium hydrides, which, according to the teachings of the U.S. Pat. No. 4,832,934, are not usable because of their inactivity and are obtained without the aforementioned complex catalysts at elevated temperatures from the elements, for the preparation of complex halogen magnesium aluminum hydridohalides. Contrary to the teachings of the U.S. Pat. No. 4,832,934, compounds of the general formula $$[\ Mg_2X_3(Ether)_y]^+ [\ AlH_{4-n}X_n]^-$$

wherein X represents halogen, y a number from 0 to 6, n a number from 1 to 3 and ether an aliphatic or cycloaliphatic ether with 2 to 30 carbon atoms (with the exception of t-butyl ether and 1, 4-dioxane), are obtained by grinding magnesium hydride with aluminum halide in aliphatic or cycloaliphatic ethers with 2 to 30 carbon atoms (with the exception of t-butyl ether and 1, 4-dioxane.

For this method, magnesium hydride (MgH$_2$), prepared by the method of the German Offenlegungsschrift 40 39 278, has proven to be particularly useful. For the method of the German Offenlegungsschrift 40 39 278, MgH$_2$, which is added to the magnesium to be hydrogenated before the start of the reaction in amounts of at least 1.2% by weight and with a particle size not greater than 400 μm, is used for the hydrogenation of the magnesium. In the following, this magnesium hydride is referred to as "autocatalytically produced magnesium hydride."

OBJECT OF THE INVENTION

An object of the present invention is a method for the preparation of aluminum hydride (AlH$_3$) by the reaction of magnesium hydride with aluminum halide.

The present invention relates to the technical problem of producing aluminum hydride economically in good yields and with high purity, while avoiding the use of complex catalysts and using easily accessible magnesium hydride. The aluminum hydride is to be free of magnesium halide.

SUMMARY OF THE INVENTION

Surprisingly, it was found that the above-described technical problem is solved by a method, which is characterized pursuant to the invention in that magnesium hydride is used, which is obtained by the reaction of magnesium with hydrogen at a temperature of at least 250° C. and a pressure of 0.5 to 5 MPa with the proviso that, before the hydrogenation, magnesium hydride with a particle size not greater than 400 µm is added before the hydrogenation in amounts of at least 1.2% by weight, based on the magnesium to be hydrogenated, to the magnesium that is to be hydrogenated, and in that the reaction is carried out at a temperature ranging from 20° to 110° C. for a period of 30 minutes to 5 hours while constantly grinding the reactants, $MgH_2$ and $AlX_3$ (X being halogen), in the molar ratio of at least 3:2 in 1,4-dioxane.

Preferably, the reaction is carried out at a temperature ranging from 40° to 100° C.

When selecting the temperature and duration of the reaction, it should be noted that, on the one hand, the reaction rate rises with increasing temperature and, on the other, the $AlH_3$ formed decreases increasingly as the temperature rises. If the inventive method is carried out, for example, at 60° C., a reaction time of about 4 to 5 hours is required to form the $AlH_3$. Decomposition of the $AlH_3$ formed does not take place or at least not to any noteworthy extent. At a reaction temperature of about 100° C., the formation of the $AlH_3$ is completed after about 30 minutes. However, if the solution obtained of the $AlH_3$ in dioxane is kept for approximately a further hour at this temperature, the $AlH_3$ formed is decomposed once again almost quantitatively. This decomposition is, of course, also affected by the size, the material of construction and the geometry of the reaction vessel. It is therefore preferable, particularly when higher reaction temperatures are selected, to check the progress of the reaction and, after the desired conversion is attained, to avoid the decomposition of the $AlH_3$ formed by cooling the solution.

The continuous grinding ensures that the surface of the $MgH_2$ is constantly renewed and that the hydride is activated mechanically.

The use of 1,4-dioxane with a dipole moment of 0 Debye has proven to be important, since the reaction is steered in a different direction if ethers with a dipole moment of more than 0.5 Debye are used (with the exception of t-butyl ether) and halogen magnesium aluminum hydridohalides are formed.

The molar ratio of the reactants, $MgH_2$ and $AlCl_3$, which is to be maintained theoretically, is 3:2. However, the use of a certain excess of $MgH_3$ is entirely appropriate. The unreacted $MgH_2$ can be removed easily, for example, by filtration or centrifugation.

It is not necessary to remove the aluminum hydride from its solution in 1,4-dioxane in every case, since the solution of aluminum hydride in 1,4-dioxane can be used directly for reducing organic compounds.

Through the use of the autocatalytically produced, nonpyrophoric and easily handled magnesium hydride, the inventive method combines the point of view of process safety with that of economic efficiency. The inventive method for the first time provides the opportunity of making aluminum hydride available on a broad scale. According to Ullmann (loc. cit.), such an opportunity did not exist previously.

The following Examples are intended to explain the inventive method further and confirm the industrial applicability of the aluminum hydride, produced pursuant to the invention, for reducing functional organic compounds, it being understood that the Examples are provided by way of illustration and not by way of limitation.

A. EXAMPLES OF THE INVENTIVE METHOD

Example 1

Autocatalytically produced magnesium hydride (9.37 g, 0.32 moles, having a hydride content of 90%) and 21.36 g (0.16 moles) of aluminum chloride are added to a glass ball mill and mixed with 463.5 g of 1,4-dioxane. While being ground continuously, the reaction mixture is heated for 30 minutes at the refluxing temperature. A sample is taken from the reactor with a syringe and centrifuged. Aliquots of the clear supernatant, so obtained, are used for the complexometric determination of aluminum and magnesium and for the gas volumetric determination of hydrogen.

The analysis confirms an aluminum content of 0.33 mmoles per gram of solution. This content corresponds to a hydride content of 0.80 mmoles of H/g and to a yield of 77% of the theoretically yield, based on the $AlCl_3$ used. Magnesium is not detectable in the solution and a potentiometric chloride determination confirms the absence of halide.

A continuation of the reaction under reflux conditions and further constant grinding leads to decomposition of the aluminum hydride originally formed. This is confirmed by the complexometric titration of aluminum, which was carried out parallel to the above:

| Reaction Time Minutes | Hydride Content mmoles/g | Al Content mmoles/g |
| --- | --- | --- |
| 60 | 0.19 | 0.070 |
| 90 | 0.01 | 0.006 |
| 120 | <Limit of Detection | <Limit of Detection |

Example 2

A 96%, autocatalytically produced magnesium hydride (6.69 g, 0.244 moles) is heated to 100° C. in a glass ball mill together with 21.7 g (0.163 moles) of aluminum chloride in 463.5 g of 1,4-dioxane.

After a reaction time of 30 minutes, the heated reaction mixture is filtered over a P4 protective gas, sintered glass filter and a sample of the clear filtrate is subjected to a gas volumetric hydrogen determination.

The hydride content is 0.77 mmoles of $H^-$/g (73% of the theoretical amount).

A complexometric aluminum determination shows the aluminum concentration to be 0.33 mmoles $Al^{3+}$/g.

The magnesium content of this filtrate is below the usual limit of detection for the complexometric determination of $Mg^{2+}$.

Example 3

A 96% autocatalytically produced magnesium hydride (6.97 g, 0.254 moles) is reacted at 80° C. in a glass ball mill with constant grinding with 22.6 g (0.169 moles) of aluminum chloride in 463.5 g of 1,4-dioxane.

During the reaction, samples are taken from the reaction mixture and centrifuged. The clear supernatant obtained is analyzed for the aluminum content and the hydride content.

The samples taken illustrate the following course of the reaction:

| Reaction Time Minutes | Hydride Content mmoles/g | Al Content mmoles/g |
| --- | --- | --- |
| 30 | 0.39 | 0.35 |
| 60 | 0.85 | 0.34 |
| 90 | 0.82 | 0.28 |
| 120 | 0.67 | 0.22 |

A complexometric determination of magnesium confirms that the magnesium content of the final sample lies below the analytical limit of detection. A potentiometric determination of chloride, carried out parallel to the above, shows the absence of chloride.

Example 4

In a glass ball mill, 8.94 g (0.326 moles) of an autocatalytically produced magnesium hydride is heated with constant grinding to 60° C. together with 29.0 g (0.217 moles) of aluminum chloride in 462 g of 1,4-dioxane. During the reaction, samples are taken with a syringe from the reaction mixture and centrifuged. Aliquots of the clear supernatant obtained are used for the gas volumetric determination of hydrogen and the complexometric determination of aluminum, the following reaction course being obtained:

| Reaction Time Minutes | Hydride Content mmoles/g | Al Content mmoles/g |
| --- | --- | --- |
| 30 | 0.06 | 0.42 |
| 60 | 0.17 | 0.41 |
| 120 | 0.62 | 0.37 |
| 180 | 1.12 | 0.45 |
| 240 | 1.30 | 0.41 |
| 300 | 1.33 | 0.40 |
| 360 | 1.32 | 0.42 |

The hydride content after 300 minutes corresponds to a 96% yield. After 360 minutes, further samples are drawn for the complexometric determination of magnesium and the potentiometric determination of chloride. Neither magnesium nor chloride are found.

B. EXAMPLES OF THE USE OF THE $AlH_3$, PRODUCED PURSUANT TO THE INVENTION, AS REDUCING AGENT

Example 5

An aluminum hydride solution in 1,4-dioxane, containing 0.49 mmoles $H^-$/g, is prepared as in Example 1. This solution (101.9 g) is added to a multineck flask, stirred with a magnetic stirrer and heated to 80° C. Acetophenone (2.4 g, 0.02 moles) is slowly added dropwise, the temperature of the reaction mixture increasing to 90° C. At the end of the addition, stirring is continued for 1 hour at 80° C.

The reaction mixture is swiftly cooled in ice, hydrolysed with dilute hydrochloric acid, salted out with sodium chloride and extracted three times with small portions of ether. The combined extracts are dried over $Na_2SO_4$ and concentrated. The residue is analyzed spectroscopically by $^1$H-NMR. The spectroscopic analysis confirms a yield of 94% of 1-phenylethanol, based on the acetophenone used.

Example 6

The aluminum hydride solution in 1,4-dioxane (101.9 g, 0.05 moles of $H^{31}$) are added to a multineck flask, stirred with a magnetic stirrer and heated to 80° C. Benzophenone (3.64 g, 0.02 moles) is dissolved in 20 g of 1,4-dioxane. This solution is slowly added dropwise to the aluminum hydride in the flask. The reaction that occurs is exothermic and raises the temperature of the reaction mixture to 100° C., the evolution of a gas being observed.

At the end of the addition, stirring is continued for 1 hour at 80° C. The product is then worked up hydrolytically as in Example 2.

$^1$H-NMR spectroscopy confirms a 40% yield of diphenylmethanol (based on the benzophenone used).

Example 7

The aluminum hydride stock solution in 1,4-dioxane (99.4 g, 0.049 moles of $H^{31}$), used in Examples 5 and 6, is added to a multineck flask, stirred with a magnetic stirrer and heated to 80° C. α-Angelica lactone (1.91 g, 0.019 mmoles) is slowly added dropwise. A vigorous reaction sets in and the temperature increases to 100° C. At the end of the addition, the reaction mixture is stirred for a further hour at 80° C.

The product is worked up as in the preceding examples. The yield of 1,4-pentanediol is 95% according to $^1$H-NMR analysis, based on the α-angelica lactone used.

Example 8

An aluminum hydride solution in 1,4-dioxane (174.3 g, approximately 122.0 mmoles of $H^{31}$), prepared as in Example 1 and containing 0.70 mmoles of $H^-$/g, is added to a multineck flask at room temperature and stirred with a magnetic stirrer. In the course of an hour, 5.0 g (71.3 mmoles) of crotonaldehyde are added dropwise, the temperature of the reaction mixture increasing to 52° C. At the same time, a precipitation is observed. Stirring is continued for an hour, after which the reaction mixture is worked up as in the preceding examples. $^1$H-NMR analysis confirms a product composition of 43% crotyl alcohol and 57% n-butanol, based on the crotonaldehyde used.

We claim:

1. A method for preparing aluminum hydride ($AlH_3$) by reacting magnesium hydride with aluminum halide in presence of a solvent, comprising the steps of preparing magnesium hydride by reacting magnesium with hydrogen at a temperature of at least 250° C. and a pressure of 0.5 to 5 MPa with the proviso that, before the hydrogenation, magnesium hydride with a particle size not greater than 400 μm is added in an amount of at least 1.2% by weight, based on the magnesium to be hydrogenated, to the magnesium, and reacting magnesium hydride thus formed with aluminum halide at a temperature ranging from 20° to 110° C. for a period of 30 minutes to 5 hours while constantly grinding the reactants, $MgH_2$ and $AlX_3$ (X being halogen), in a molar ratio of at least 3:2.

2. The method of claim 1, comprising reacting magnesium hydride with aluminum halides at a temperature of about between 40° and 100° C.

* * * * *